UNITED STATES PATENT OFFICE.

JAMES HENRY TRICKEY, OF HAMILTON, ONTARIO, CANADA.

ART OR PROCESS OF AND COMPOSITION FOR MAKING ARTIFICIAL STONE.

SPECIFICATION forming part of Letters Patent No. 308,111, dated November 18, 1884.

Application filed September 20, 1884. (No specimens.)

*To all whom it may concern:*

Be it known that I, JAMES HENRY TRICKEY, of Hamilton, in the county of Wentworth, in the Province of Ontario, Dominion of Canada, have invented a certain new and useful Art or Process of and Composition for Making Artificial Stone; and I do hereby declare that the following is a full, clear, and exact description of the same.

The invention relates to a certain composition and process for making artificial stone and hardening it, which, when completed, is so firm and close in the grain as to be capable of receiving a very high polish, and suitable for being carved in relief. The composition can be run in a plastic state into gelatine molds in any desired form for ornamental work, such as center-pieces, mantel-pieces, statues, table-tops, wash-stand tops, grave-stones, &c., and all kinds of ornaments which are usually made of plaster-of-paris.

The first part of my invention consists in mixing plaster-of-paris, marble or stone dust, glycerine, and water, coloring it in imitation of marble or stone, as desired, then molding the composition into any desired form by hand, or casting it in molds for the different purposes intended. When a sufficient number of articles are molded at any one time, they are piled up in a dry-kiln with air-spaces between and subjected to the action of drafts of atmospheric air and the solar rays, remaining thus exposed for about thirty days. The articles could be forced to dry quicker in a heated oven; but I prefer to allow them to dry slowly, as above stated.

The second part of my invention consists in preparing a heated bath composed of a solution of brimstone and boiled linseed-oil or equivalent oil, (in some cases the oils might be omitted,) and placing therein the molded articles, as above stated, and boiling them until they sink to the bottom of the bath, which would vary according to the size of the article. For instance, a piece of composition, say, one inch thick will take from two to four hours to sink, according to circumstances. When the articles remain a sufficient time in the heated bath, they are taken out and put into an oven heated to about from 125° to 150°, and allowed to remain there two or three days, and gradually cooled off; or they may be put up in paper when taken out of the bath and allowed to stand for about a week in an airy room. After this the articles are polished by the same process as marble is polished, they taking a very high and smooth polish similar to it.

It may be observed that when I wish to make the composition harder than usual I heat and cool alternately the brimstone bath before immersing the prepared composition therein. This has the effect of making the composition so hard as to admit of the same smooth and high polish as marble, and just as capable of being carved in relief. Plaster-of-paris itself, boiled in the above-mentioned solution, is capable of taking a high polish, and becomes very hard, and will have a fine appearance if flowed with varnish. It may further be observed that soft kinds of stone—such as sandstone, potter's clay, Portland cement, and similar substances—as well as wood—can be hardened very much by boiling them in my prepared bath, as hereinbefore mentioned. I may add that in experimenting I have added litharge, glue, soda-ash, or potash to the brimstone for boiling the composition in; but I prefer the brimstone alone, or it and boiled linseed or equivalent oils or varnish.

The advantages of my invention are: The artificial stone can be made of any color or combination of colors to imitate the various kinds of marble, and used for the same general purposes as it is, and is equal if not superior to it in strength, durability, capability of being carved in relief, and is susceptible of as high a polish, while it is very much more economical in cost. The various kinds of granite can also be imitated. It is equally adapted to the imitation of slate, and can be used for all the purposes slate is used for.

The composition being capable of being run into molds while plastic and afterward so hardened as to be susceptible of the highest polish renders it fit for an endless variety of useful and ornamental purposes altogether too numerous to mention.

Having thus described my process of and composition for making artificial stone, what I claim as my invention, and desire to secure by Letters Patent, is—

1. Artificial stone composed of plaster-of-paris, glycerine, and water, and after becoming set and dried being boiled in a solution of brimstone, substantially as specified.

2. A composition for artificial stone, composed of plaster-of-paris, marble or stone dust, glycerine, and water, and after becoming set and dried being boiled in a solution of brimstone and boiled linseed-oil or equivalent oil, substantially as specified.

3. The art or process of hardening plaster-of-paris, Portland cement, or similar compositions, soft stone, wood, &c., by boiling them in a solution of brimstone and boiled linseed or equivalent oil, substantially as specified.

Dated at Hamilton, Ontario, Dominion of Canada, this 4th day of September, 1884.

JAMES HENRY TRICKEY.

In presence of—
W. E. YATES,
WM. BRUCE.